US008773363B2

(12) United States Patent
Laurent et al.

(10) Patent No.: US 8,773,363 B2
(45) Date of Patent: Jul. 8, 2014

(54) CONTROL MODULE FOR AN AUTOMOTIVE VEHICLE USING A TOUCH SENSOR

(75) Inventors: Patrice Laurent, Vuiz en Sallaz (FR); Xavier Drouin, Annemasse (FR)

(73) Assignee: DAV, Creteil (FR)

( * ) Notice: Subject to any disclaimer, the term of this patent is extended or adjusted under 35 U.S.C. 154(b) by 1229 days.

(21) Appl. No.: 12/438,259

(22) PCT Filed: Jul. 26, 2007

(86) PCT No.: PCT/EP2007/057728

§ 371 (c)(1), (2), (4) Date: Jun. 18, 2009

(87) PCT Pub. No.: WO2008/022872

PCT Pub. Date: Feb. 28, 2008

(65) Prior Publication Data

US 2010/0020028 A1 Jan. 28, 2010

(30) Foreign Application Priority Data

Aug. 23, 2006 (FR) ..................................... 06 07483

(51) Int. Cl.
*G06F 3/041* (2006.01)
*G06F 3/045* (2006.01)

(52) U.S. Cl.
USPC ........................................ 345/173; 178/18.05

(58) Field of Classification Search
CPC ....... G06F 1/1643; G06F 1/169; G06F 3/041; G06F 3/0412; G06F 3/0414; G06F 3/045
USPC ............ 345/173–178, 207; 178/18.01–18.11, 178/20.01–20.04; 349/12; 382/103, 107, 382/124; 341/20
See application file for complete search history.

(56) References Cited

U.S. PATENT DOCUMENTS 4,810,992 A * 3/1989 Eventoff ......................... 338/99
5,008,497 A 4/1991 Asher
5,062,198 A * 11/1991 Sun ................................. 29/622
5,149,923 A * 9/1992 Demeo ......................... 200/5 A
5,239,152 A * 8/1993 Caldwell et al. .............. 200/600

(Continued)

FOREIGN PATENT DOCUMENTS

DE 26 13 024 9/1977
DE 197 02 957 A1 8/1998

(Continued)

*Primary Examiner* — Joe H Cheng
*Assistant Examiner* — Keith Crawley
(74) *Attorney, Agent, or Firm* — Daly, Crowley, Mofford & Durkee, LLP

(57) ABSTRACT

The present invention relates to a control module that comprises at least one touch control surface (3) made of a sensor (31) sensitive to the pressure applied on the touch surface (3) and of a flexible protection layer (33) covering said sensor (31) and allowing a pressure to be locally transmitted to the sensor. The module further includes a rigid mechanical support (15) in which openings (27) are formed, allowing therethrough the light from at least one light source (25) and defining back-lighting regions of the touch surface (3), and a plate (20) of an incompressible material and transparent to the light which is sandwiched between the mechanical support (15) and the sensor (31) and defines a continuous smooth surface at the touch surface (3), wherein the sensor (31) and the flexible protection layer (33) are made so as to allow the light at least partially through the back-lighting regions.

17 Claims, 4 Drawing Sheets

(56) References Cited

U.S. PATENT DOCUMENTS

| | | | | |
|---|---|---|---|---|
| 6,822,640 | B2 * | 11/2004 | Derocher | 345/173 |
| 7,030,860 | B1 * | 4/2006 | Hsu et al. | 345/173 |
| 7,224,324 | B2 * | 5/2007 | Quist et al. | 345/7 |
| 7,324,095 | B2 * | 1/2008 | Sharma | 345/175 |
| 7,443,388 | B1 * | 10/2008 | Novak | 345/173 |
| 7,915,553 | B2 * | 3/2011 | Arione et al. | 200/314 |
| 8,098,236 | B2 * | 1/2012 | Klein et al. | 345/173 |
| 2002/0122925 | A1 * | 9/2002 | Liu et al. | 428/212 |
| 2004/0090429 | A1 * | 5/2004 | Geaghan et al. | 345/173 |
| 2005/0052425 | A1 * | 3/2005 | Zadesky et al. | 345/173 |
| 2005/0140660 | A1 * | 6/2005 | Valikangas | 345/173 |
| 2006/0045989 | A1 * | 3/2006 | Minami | 428/1.1 |
| 2006/0119586 | A1 * | 6/2006 | Grant et al. | 345/173 |
| 2006/0192771 | A1 * | 8/2006 | Rosenberg et al. | 345/173 |
| 2006/0238513 | A1 * | 10/2006 | Philipp | 345/173 |
| 2006/0250354 | A1 * | 11/2006 | Takata et al. | 345/156 |
| 2006/0256075 | A1 * | 11/2006 | Anastas et al. | 345/156 |
| 2007/0018965 | A1 * | 1/2007 | Paun et al. | 345/173 |
| 2007/0152983 | A1 * | 7/2007 | McKillop et al. | 345/173 |
| 2007/0227795 | A1 * | 10/2007 | Dorn et al. | 180/90 |
| 2008/0204418 | A1 * | 8/2008 | Cybart et al. | 345/173 |
| 2008/0266272 | A1 * | 10/2008 | Narayan et al. | 345/174 |
| 2009/0243824 | A1 * | 10/2009 | Peterson et al. | 340/435 |

FOREIGN PATENT DOCUMENTS

| | | | | | |
|---|---|---|---|---|---|
| DE | 197 05 536 | A1 | 8/1998 | | |
| DE | 199 35 386 | A1 | 2/2001 | | |
| EP | 0 541 102 | A1 | 5/1993 | | |
| EP | 0 803 711 | A1 | 10/1997 | | |
| EP | 1 429 355 | A1 | 6/2004 | | |
| EP | 1 429 356 | A1 | 6/2004 | | |
| FR | 2 683 649 | | 5/1993 | | |
| WO | WO 2005/035299 | * | 4/2005 | | B60K 37/06 |

* cited by examiner

CONTROL MODULE FOR AN AUTOMOTIVE VEHICLE USING A TOUCH SENSOR

CROSS REFERENCE TO RELATED APPLICATIONS

This application claims the benefit of International Patent Application PCT/EP2007/057728 filed Jul. 26, 2007, published in the French language as WO2008/022872, which application claims priority from French application number 0607483, filed Aug. 23, 2006.

The present invention relates to a control module, in particular for a motor vehicle.

More precisely, an advantageous application of such a module is for the controls found on the console between the two front seats of a motor vehicle in order, for example, to control air-conditioning functions, an audio system, a telephone system or a navigation system.

The invention may also be applied in a region of the vehicle called the dome, which is situated at the usual location of the interior rearview mirror, for example to control interior lighting, a central locking system, a sunroof, the hazard warning lights or floodlights.

This module may also be used for the window regulator controls, exterior rearview mirror controls or controls for moving motorized seats.

In the automobile field the control of various electrical units is conventionally realized by switches/on/off switches. However, in view of the growing number of electrical units to be controlled, multifunctional control devices are being used more and more due to the resulting ergonomic advantages. Indeed, on the basis of a single control button, made for example in the form of a joystick, associated with a display screen, it is possible to navigate in scrolling menus in order to control, for example, the air conditioning, the audio system, or the navigation system.

To increase ergonomic comfort, the use of touch sensor technology, alone or complementing such multifunction buttons, may be considered to be an interesting development.

Specifically, touch sensors, in particular for the automobile field, have made significant progress. A technology using pressure-sensitive resistors (also known by the name FSR sensor for "Force Sensing Resistor") increasingly leads other equivalent technologies, such as for example capacitive or optical technologies, thanks to its ease of employment and its robustness.

Such sensors are, for example, known by the name of Digitizer Pads, and the following documents are cited as the prior art: U.S. Pat. No. 4,810,992, U.S. Pat. No. 5,008,497, FR 2683649 or EP 0 541 102.

These sensors comprise flexible semiconductor layers sandwiched between, for example, a conducting layer and a resistive layer. By exerting pressure on the FSR layer its ohmic resistance is reduced, thus making it possible, by applying a suitable electrical voltage, to measure the applied pressure and/or the location of the place where the pressure is exerted.

According to a different design of the FSR technology, the touch sensor comprises two flexible carrier sheets spaced apart from one another by elastic spacers and bearing on the facing faces elements enabling electrical contact to be produced when the sensor is compressed (see for example EP 1 429 355 and EP 1 429 356).

However, through their design the known sensors are generally opaque, which poses problems for illuminating controls for night driving in a motor vehicle.

In fact, backlighting of signaling symbols, i.e. illumination through the rear face, has established itself in the automobile field for its advantages in ergonomic terms and in terms of its possibilities for integration at the level of a control. For a control button, for example, its control face is provided with a pictogram showing the function which can be controlled by this button. This pictogram is often made of white plastic which lets through the light from a light-emitting diode located behind the pictogram. During daytime driving the driver clearly perceives the white pictogram on the button, and during night driving the backlighting enables the driver to locate the control easily.

The present invention aims to propose a control module comprising a touch sensor sensitive to a pressure exerted on this sensor which may benefit from backlighting in order to better locate functions to be controlled, in particular during night driving.

To this end, the subject of the invention is a control module, comprising at least one touch control surface made by means of a sensor sensitive to pressure exerted on the touch surface and a flexible protection layer covering said sensor and enabling pressure to be transferred locally to the sensor, characterized in that it furthermore comprises a rigid mechanical support in which openings are formed enabling light to pass from at least one light source and defining backlighting regions of the touch surface, and a plate made of an incompressible material and allowing light to pass which is sandwiched between the mechanical support and the sensor, and which defines a smooth continuous surface at the level of the touch surface, and in that the sensor and the flexible protection layer are made so as to allow light to pass at least partly in the backlighting regions.

The subject of the invention is furthermore a multifunction control device for controlling the functions of at least one set of electrical or electronic units of a motor vehicle, such as an air-conditioning system, an audio system, a navigation system, a telephone system, motorized window regulator controls, controls for adjusting exterior rearview mirrors, controls for adjusting the position of a sunroof, interior lighting controls, controls for adjusting the seat of a motor vehicle, characterized in that it comprises a module as defined above.

Other features and advantages of the invention will emerge from the following description, provided by way of example, without limitation, with regard to the appended drawings in which.

A nonlimiting exemplary embodiment of the invention for a multifunction control application will be described in the following in relation to the appended figures.

Figure 1:
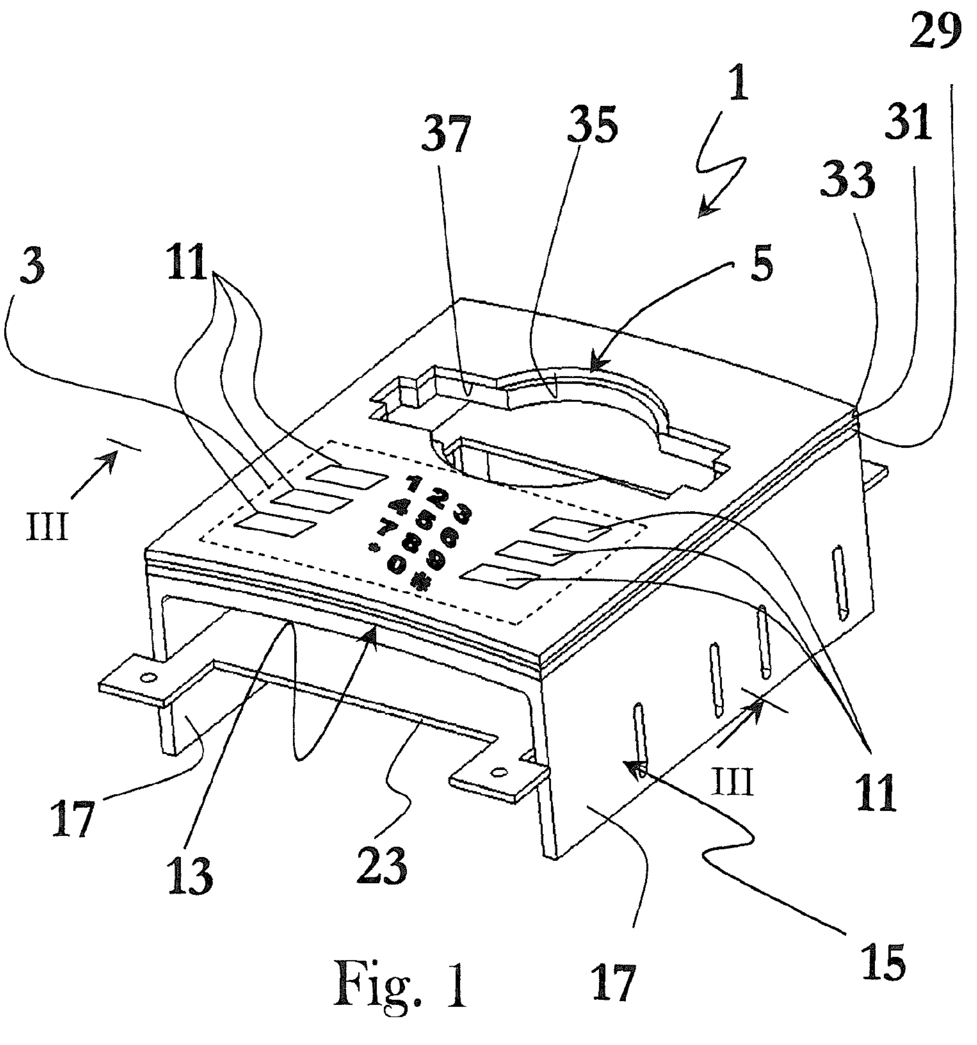
FIG. 1 shows a perspective view of a module according to the invention in the assembled state.

FIG. 1 shows a control module 1 according to the invention which has a generally parallelepipedal shape, intended to be fitted in a motor vehicle, preferably on the middle console between the two front seats.

Of course, other shapes and other locations are conceivable depending on the controls to be produced and their usual location.

The module comprises a touch control surface 3 indicated in dotted lines and, optionally, a housing 5 for receiving, for example, a multifunction button such as a joystick.

Inside the touch control surface 3 six touch areas are defined for selecting electrical or electronic units 11 (for example "Main Menu", "Radio", "CD", "Navigation", "Telephone", and "Air conditioning") along with a conventional alphanumeric keyboard 13 with twelve touch keys (the numbers "0" to "9" as well as the symbols "#" and "*"). Each area or key contains a symbol or inscribed letter(s) or number(s) related to the function to be controlled, which, as will be described further below, may be permanently visible according to a first embodiment or, according to a second embodiment, visible only if backlighting is applied.

Figure 2:
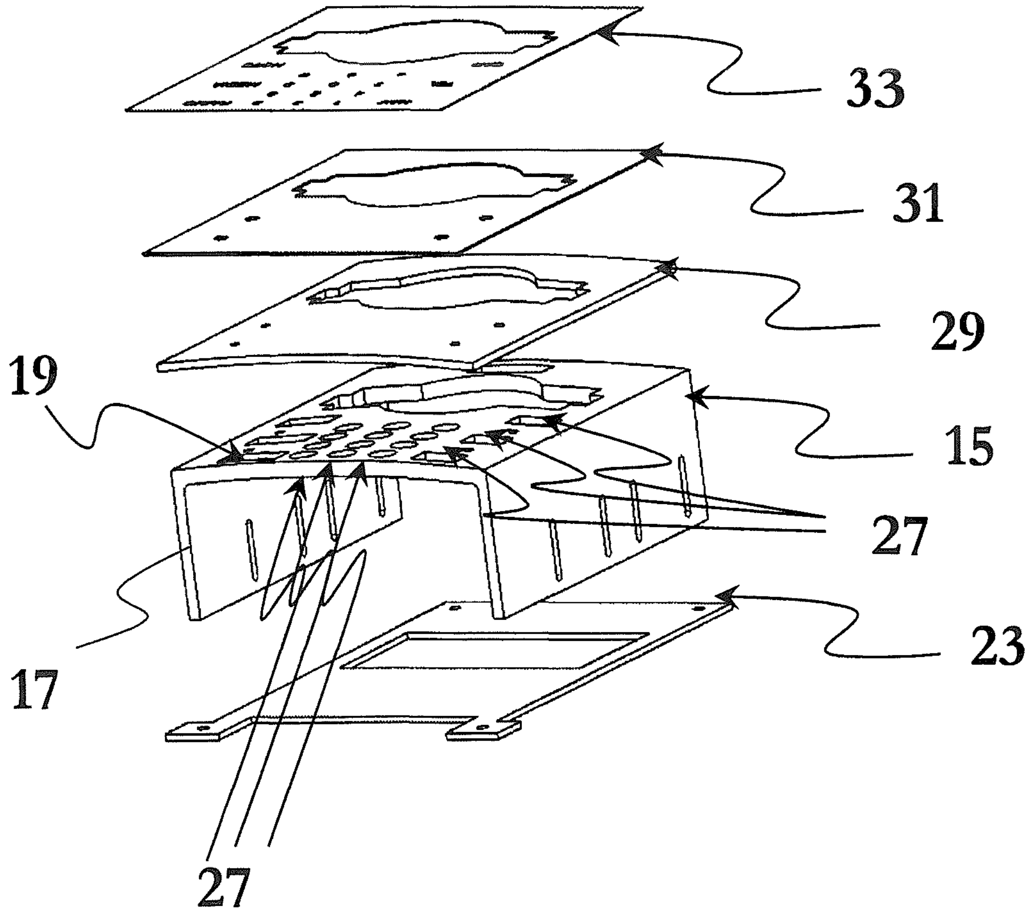
FIG. 2 shows an exploded perspective view of FIG. 1.
Figure 3:
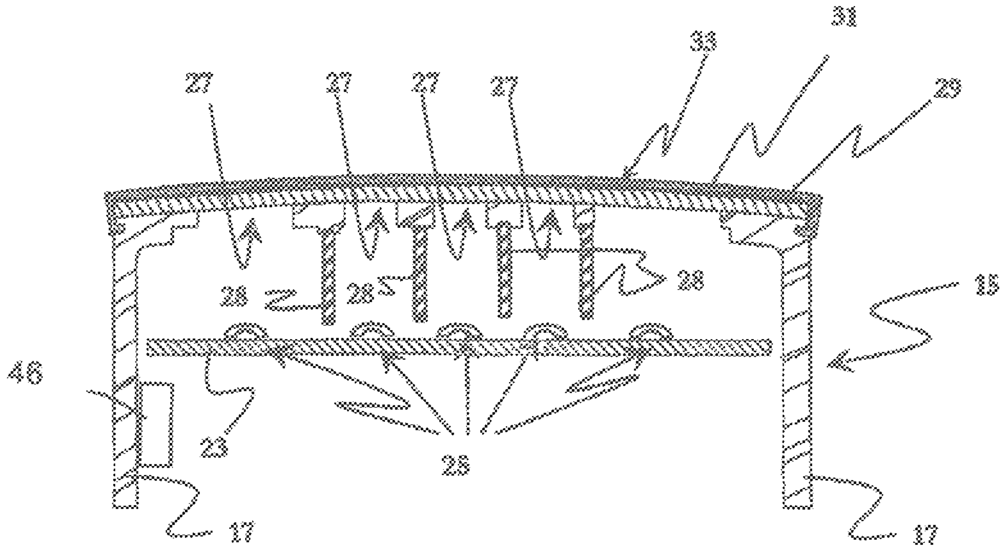
FIG. 3 shows a cross-sectional view along the line III-III of FIG. 1.

As can be seen better with reference to FIGS. 2 and 3, the control module 1 comprises a rigid mechanical support 15, made for example of plastic, with two side walls 17 and a slightly domed/curved horizontal part 19 supported by the walls 17.

A printed circuit board 23 carrying light sources 25, such as light-emitting diodes (LEDs), is held between the walls 17.

Openings 27 are formed in the part 19 of the support 15 (see FIG. 3), allowing the light coming from the light sources 25 to pass and defining the backlighting regions for the symbols or inscribed letter(s) or number(s) of the touch area 3. Preferably, one light source 25 is provided per backlighting region, as the latter is surrounded by separating walls 28, to allow selective illumination of one or several touch areas and to obtain an optimum illumination result.

The shape of the openings 27 is advantageously a circular shape, at least for the touch keys of the alphanumeric keyboard 13, or an oval shape, in particular for an area with elongate dimensions. Given that the light-emitting diodes generally emit a cone of light, this circular or oval shape enables fairly homogeneous and uniform illumination to be obtained.

A plate 29 is placed on the support 15, said plate being made of an incompressible material and allowing light to pass. Incompressible is understood to mean that a user is not able to reduce the thickness by pressing on the plate. In order to allow light to pass through, the plate is made of a transparent or translucent material, preferably of polycarbonate.

If the use of low power light-emitting diodes is desired, a transparent plate is preferred as it does not reduce the luminescent power emitted by the sources 25.

If more uniform and homogeneous illumination is desired, in particular if the size of the backlighting region is large in relation to the size of the light source, a translucent, or even milky, plate is preferred in order to homogenize the light emitted by the sources 25.

The plate 29 is sandwiched between the support 15 on the one hand and a sensor 31 sensitive to the pressure exerted in the touch area 3 on the other hand. These sensors 31 are sensitive to a compression which slightly reduces their thickness and which is conveyed by an electrical signal that can be exploited in order to know the location being pushed and/or the pressure applied.

The sensor 31 is preferably a sensor with FSR technology such as described, for example, in documents U.S. Pat. No. 4,810,992, U.S. Pat. No. 5,008,497, FR 2683649, EP 0 541 102, or in documents EP 1 429 355 and EP 1 429 356.

It should be noted that the plate 29 is at least level with the touch control surface 3, continuous and perfectly smooth. This is understood to mean that it contains no roughness or hole at the touch surface 3.

This is because the edges of a hole or surface roughness might cause erroneous control signals and lead to premature damage to the sensor through repeated compression against an edge or roughness.

It will therefore be understood that the plate 29 enables both the sensor 31 to be protected in order to locate it in optimum working conditions and light to pass from the light sources 25, either directly (transparent plate) or by homogenizing the light flux (translucent/milky plate).

A flexible protection layer 33 covers the sensor 31 and allows a pressure applied to it to be transmitted locally.

The sensor 31 and the flexible protection layer 33 are made so as to allow light to pass at least partly in the backlighting regions.

To this end, according to a first embodiment (see the view of the principle of FIG. 4) it is envisioned to produce a sensor 31 with holes 32 so as to allow light to pass at least partly in the backlighting regions. Taking, for example, the sensor described in documents EP 1 429 355 and EP 1 429 356, it suffices to produce the edges of the holes 34 as the exterior edges of the sensor 31. The size of these holes is preferably chosen to be smaller than the fingerprint of a user. Surprisingly, it has been observed that the operation of such a sensor is not affected by these discontinuities, such as holes, in the touch surface.

Figure 5:
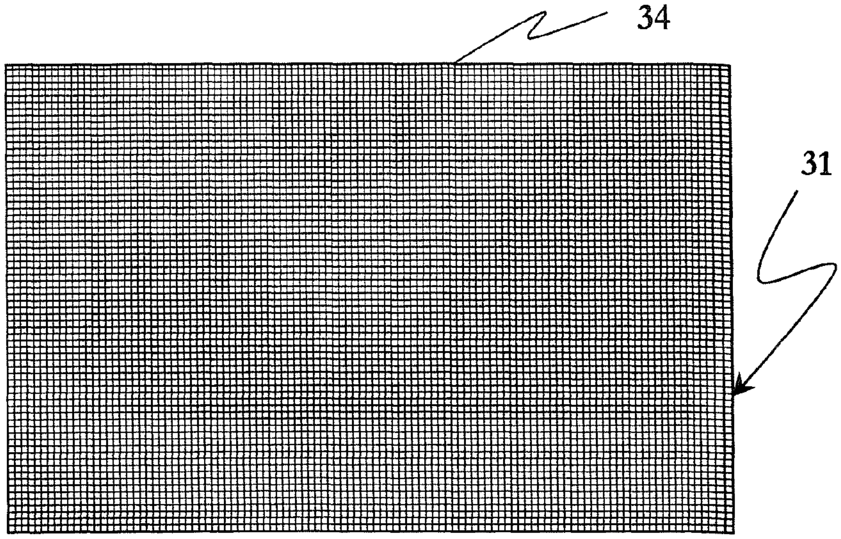
FIG. 5 is a view of the principle of a touch sensor according to a second embodiment.
Figure 6:
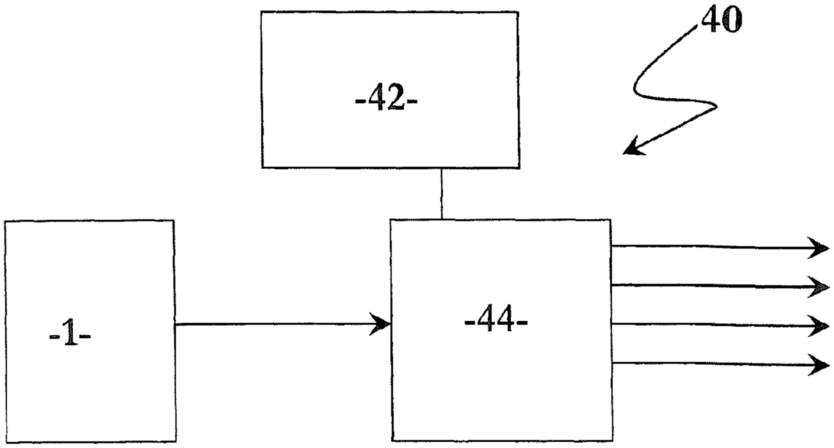
FIG. 6 is an overview diagram of a multifunction control device comprising a module according to the invention.

According to a second embodiment (see the view of the principle of FIG. 5), the sensor comprises two flexible sheets made of a material that allows light to pass and active tracks sandwiched between these flexible sheets, the tracks forming a grid 34 and the light passes through the grid 34.

With regard to the flexible layer 33, in the backlighting regions this has symbols/signs in the form of control pictograms or inscribed letter(s) or number(s). These symbols are made of a material that allows light to pass at least partly.

According to a first variant, the flexible layer 33 is, for example, made of silicone.

According to a second variant, this flexible layer 33 is made according to Black Panel technology, which is described in documents DE 2613024, DE 19702957, DE 19705536, DE 19935386, EP 0803711 or WO 2005035299. In this case the symbols/signs such as the numerals, letters or pictograms are made so that they are visible only when there is backlighting. As a result, in the absence of a light source, the protection layer 33 appears uniform without any indication or writing on the touch surface 3. In this case the flexible protection layer 33 is advantageously made of a polycarbonate sheet of a thickness of between 0.1 mm and 0.5 mm, preferably equal to around 0.2 mm. Due to its low thickness, the polycarbonate sheet is able to locally transmit a push on the sensor 31.

Returning to FIG. 1, the module 1 is able to receive, for example, a multifunction control button, made in the form of a joystick, in the central part 35 of its housing 5 and control keys in its side parts 37.

Of course, the combination of a multifunction button with the touch control surface is not necessary. To produce a simplified control module, for example, for controls for window regulators, rearview mirrors, a sunroof or a motorized seat, this housing 5 of the module is not necessary and may be omitted.

Figure 4:
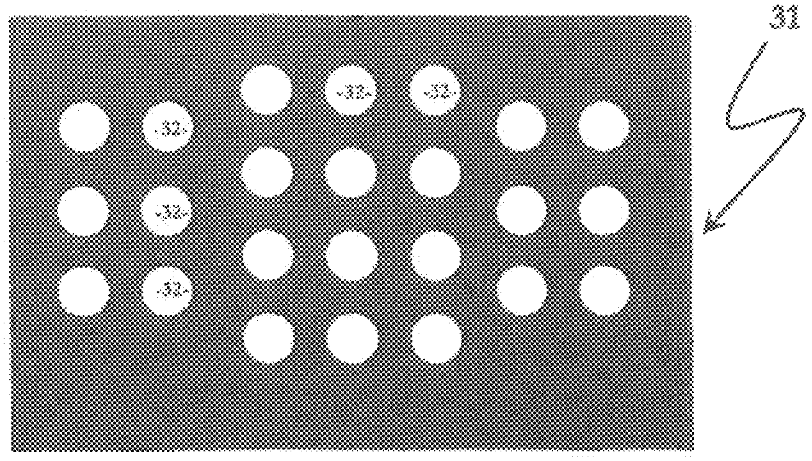
FIG. 4 is a view of the principle of a touch sensor of the module according to a first embodiment.

FIG. 4 shows an overview diagram of a multifunction control device 40 for controlling the functions of at least one set of electrical or electronic units of a motor vehicle, such as an air-conditioning system, an audio system, a navigation system, a telephone system, motorized window regulator controls, controls for adjusting exterior rearview mirrors, controls for adjusting the position of a sunroof, interior lighting controls, controls for adjusting the seat of a motor vehicle.

This device comprises a control module 1 as described in relation to FIGS. 1 to 5 along with a screen 42 for displaying the functions to be controlled.

The control module 1 and the screen 42 are connected to a processing unit 44 which manages the screen depending on the touch commands received from the module 1. This unit 44 subsequently sends the final commands to the selected system (for example increase volume for a radio system).

In order to signal to the user that his/her command has been properly detected by the touch surface 3, particularly during night driving, at least one vibrating device 46 capable of applying vibration to the control surface (FIG. 3) may additionally be provided in the control module 1.

In the present context a vibrating device is a means for applying a movement to the touch surface so that the user perceives a haptic response to his/her command.

The vibrating devices are controlled by a controller and are configured so as to apply a movement parallel to said touch surface 3.

Of course, perpendicular movements, a combination of directions of movement, percussive or other movements may also be envisioned.

It is also foreseen that the vibrating device 46 is in contact with the interior face of a side wall 17 of the mechanical support 15 in order to vibrate the touch surface 3 as shown in FIG. 3.

This arrangement makes it possible to optimize the space available in the control module.

In operation the vibrating device transmits the vibration movement to the touch surface 3 via the rigid mechanical support 15 and via the plate 29.

To do this, the support 15 has feet (not visible) engaged with pistons of the vibrating devices 46, which comprise, for example, an electric motor, an electromagnet or a piezoelectric element for moving the piston.

According to a variant embodiment (not shown), the vibrating device is in contact with the plate in order to vibrate the touch surface.

The electrical components are advantageously connected to the printed circuit board 23.

In an alternative version, the pistons may be in the form of screws engaged with the feet of the touch surface.

It is possible to provide a direct connection between the command applied, for example, by a finger of a user on the surface 3 and the haptic response to information provided by the vibrating devices.

The haptic response is detected by the finger itself.

It will therefore be understood that thanks to the plate 29 it is possible to protect the sensor from mechanical strains that are repeated or too large and which might damage the sensor and considerably reduce the lifetime thereof.

A compact control module is obtained, enabling realization of many functions that are ergonomically easily understandable.

The invention claimed is:

1. A control module, comprising:

at least one touch control surface including a sensor having a touch surface, said sensor including two flexible sheets and active tracks between the flexible sheets, said sensor sensitive to pressure exerted on the touch surface and a flexible protection layer covering said sensor and enabling pressure to be transferred locally to the sensor;

a mechanical support having openings formed therein to enable light to pass from at least one light source to define backlighting regions of the touch surface; and a single layer made of an incompressible material and allowing light to pass which is sandwiched between said mechanical support and said sensor and is in direct contact with one of the two flexible sheets of said sensor, and which defines a smooth, continuous, and incompressible surface at the level of the sensor, and wherein the sensor and the flexible protection layer are made so as to allow light to pass at least partly in the backlighting regions.

2. The control module as claimed in claim 1, wherein the openings in said mechanical support have at least one of a circular shape or an oval shape.

3. The control module as claimed in claim 1, wherein said layer of incompressible material is made of a transparent material.

4. The control module as claimed in claim 1, wherein said layer of incompressible material is made of a translucent material.

5. The control module as claimed in claim 1, wherein said layer of incompressible material is made of polycarbonate.

6. The control module as claimed in claim 1, wherein said pressure sensitive sensor is a sensor according to force sensing resistor (FSR) technology.

7. The control module as claimed in claim 6, wherein said sensor comprises holes so as to allow light to pass at least partly in the backlighting regions.

8. The control module as claimed in claim 6, wherein said sensor comprises two flexible sheets made of a material that allows light to pass and active tracks sandwiched between said flexible sheets, the tracks forming a grid, and in that the light passes through the grid.

9. The control module as claimed in claim 1, wherein the backlighting regions of the flexible protection layer have control symbols or signs made of a material that allows at least some light to pass therethrough.

10. The control module as claimed in claim 9, wherein the flexible protection layer is made of silicone.

11. The control module as claimed in claim 9, wherein the control signs are made so that they are visible only when there is backlighting.

12. The control module as claimed in claim 11, wherein the flexible protection layer is made of a polycarbonate sheet of a thickness of between 0.1 mm and 0.6 mm.

13. The control module as claimed in claim 1, further comprising at least one vibrating device capable of applying vibration to the control surface in order to signal to the user that a command has been registered.

14. The control module as claimed in claim 13, wherein the vibrating device is in contact with the layer of incompressible material.

15. The control module as claimed in claim 13, wherein the vibrating device is in contact with said mechanical support.

16. A multifunction control device for controlling the functions of at least one set of electrical or electronic units of a motor vehicle, such as an air conditioning system, an audio system, a navigation system, a telephone system, motorized window regulator controls, controls for adjusting exterior rearview mirrors, controls for adjusting the position of a sunroof, interior lighting controls, controls for adjusting the seat of a motor vehicle comprising:

at least one touch control surface including a sensor having a touch surface, the sensor including two flexible sheets and active tracks between the flexible sheets, said sensor sensitive to pressure exerted on the touch surface and a flexible protection layer covering said sensor and enabling pressure to be transferred locally to the sensor;

a mechanical support having openings formed therein to enable light to pass from at least one light source define backlighting regions of the touch surface;

a single layer made of an incompressible material and allowing light to pass which is sandwiched between said mechanical support and said sensor and is in direct contact with one of the flexible sheets of the sensor, and which defines a smooth continuous, and incompressible surface at the level of the sensor, and wherein the sensor and the flexible protection layer are made so as to avow light to pass at least partly in the backlighting regions.

17. The device as claimed in claim 16, further comprising a screen for displaying the functions to be controlled.

* * * * *

UNITED STATES PATENT AND TRADEMARK OFFICE

CERTIFICATE OF CORRECTION

PATENT NO. : 8,773,363 B2
APPLICATION NO. : 12/438259
DATED : July 8, 2014
INVENTOR(S) : Patrice Laurent et al.

It is certified that error appears in the above-identified patent and that said Letters Patent is hereby corrected as shown below:

In the Claims

Col. 6, line 41, delete “0.6 mm” and replace with --0.5 mm--

Col. 7, line 7, delete “as to avow light” and replace with --as to allow light--

Signed and Sealed this
Twelfth Day of May, 2015

Michelle K. Lee
*Director of the United States Patent and Trademark Office*